G. E. HENDEY.
Whip-Socket Fastening.

No. 198,021. Patented Dec. 11, 1877.

WITNESSES:
A. W. Almquist
J. H. Scarborough

INVENTOR:
G. E. Hendey.
BY Munn &co.
ATTORNEYS.

UNITED STATES PATENT OFFICE.

GEORGE E. HENDEY, OF WATERBURY, CONN., ASSIGNOR TO HIMSELF AND HENRY A. MATTHEWS, OF SAME PLACE.

IMPROVEMENT IN WHIP-SOCKET FASTENINGS.

Specification forming part of Letters Patent No. 198,021, dated December 11, 1877; application filed October 22, 1877.

*To all whom it may concern:*

Figure 1:
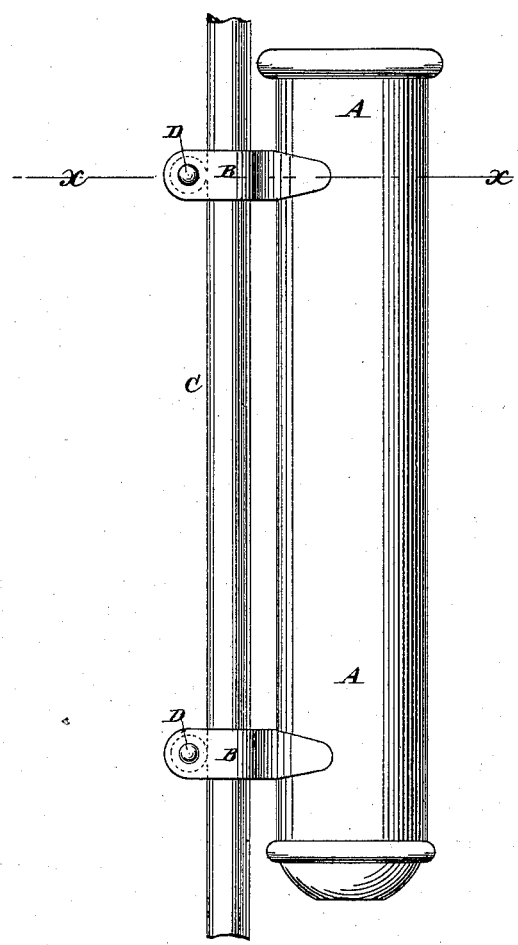
Figure 2:
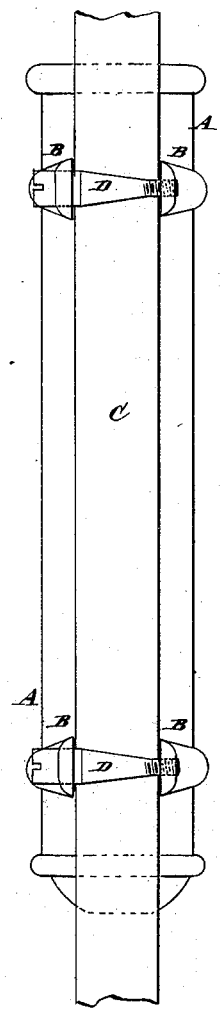
Figure 3:
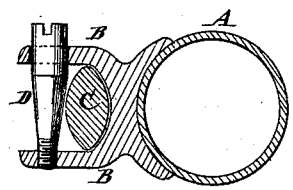

Be it known that I, GEORGE E. HENDEY, of Waterbury, in the county of New Haven and State of Connecticut, have invented a new and useful Improvement in Whip-Socket Fastening, of which the following is a specification:

Figure 1 is a side view of my improved whip-socket, shown as secured to the bar of a dasher. Fig. 2 is a front view of the same. Fig. 3 is a cross-section of the same, taken through the line $x$ $x$, Fig. 1.

Similar letters of reference indicate corresponding parts.

The object of this invention is to furnish an improved fastening for securing a whip-socket to the bar of a dasher, which shall be so constructed that it may be used upon bars varying in thickness, and which shall be simple in construction and convenient in use.

The invention consists in the combination of the tapering or conical screws with the lugs of a whip-socket, for securing said socket to the bar of a dasher, as hereinafter fully described.

A represents the socket, upon which are formed or to which are attached lugs B, which are forked to receive the bar C of the dasher.

D represents tapering or conical screws, having screw-threads cut upon their smaller ends. The screws D pass through smooth holes in one arm, and screw into screw-holes in the other arm, of the lugs B.

With this construction, should the socket become loose a partial turn of the screws D will bind it securely in place, the said screws acting as wedge-keys to secure or fasten it to the dasher-bar.

Having thus described my invention, I claim as new and desire to secure by Letters Patent—

The bolts D, nicked on top, tapered on shank, and provided with end thread, in combination with the forks or lugs B of a whip-socket, as and for the purpose specified.

GEORGE E. HENDEY.

Witnesses:
CHARLES H. MATTHEWS,
THOMAS C. HENDEY.